United States Patent
Lopez et al.

(10) Patent No.: US 10,744,714 B2
(45) Date of Patent: Aug. 18, 2020

(54) MISALIGNMENT DETECTION FOR A 3D PRINTING DEVICE

(71) Applicants: HEWLETT-PACKARD DEVELOPMENT COMPANY, L.P., Houston, TX (US); Miguel Angel Lopez, Vancouver, WA (US); Raul Rodriguez Alonso, Sant Joan de Vilatorrada (ES); Xavier Quintero Ruiz, Sant Cugat del Valles (ES)

(72) Inventors: Miguel Angel Lopez, Vancouver, WA (US); Raul Rodriguez Alonso, Sant Joan de Vilatorrada (ES); Xavier Quintero Ruiz, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 179 days.

(21) Appl. No.: 15/542,379

(22) PCT Filed: Apr. 30, 2015

(86) PCT No.: PCT/EP2015/059564
§ 371 (c)(1),
(2) Date: Jul. 7, 2017

(87) PCT Pub. No.: WO2016/173668
PCT Pub. Date: Nov. 3, 2016

(65) Prior Publication Data
US 2018/0036949 A1 Feb. 8, 2018

(51) Int. Cl.
*B29C 64/165* (2017.01)
*B29C 64/386* (2017.01)
(Continued)

(52) U.S. Cl.
CPC .......... *B29C 64/165* (2017.08); *B29C 64/112* (2017.08); *B29C 64/386* (2017.08); *B29C 64/393* (2017.08); *B33Y 50/02* (2014.12)

(58) Field of Classification Search
CPC ... B29C 64/112; B29C 64/165; B29C 64/393; B29C 64/386; B33Y 50/02; B33Y 30/00; B41J 2029/3935
See application file for complete search history.

(56) References Cited

U.S. PATENT DOCUMENTS

| 5,980,812 A | 11/1999 | Lawton |
| 6,089,766 A | 7/2000 | Yamada et al. |

(Continued)

FOREIGN PATENT DOCUMENTS

| WO | WO-2013164408 | 11/2013 |
| WO | WO-2015040185 | 3/2015 |

OTHER PUBLICATIONS

Computer Aided Technology, "Head Alignment on your Objet Desktop 3D Printer", YouTube video published Feb. 18, 2014, https://www.youtube.com/watch?v=lxgb-FQccc4 (Year: 2014).*

(Continued)

*Primary Examiner* — Joseph S Del Sole
*Assistant Examiner* — Jerzi H Moreno Hernandez
(74) *Attorney, Agent, or Firm* — HP Inc. Patent Department

(57) ABSTRACT

Misalignments of a 3d printing device may be detected by providing a reference pattern in a print zone of the 3d printing device, wherein the reference pattern comprises a plurality of reference marks, printing a test pattern on the reference pattern by means of the 3d printing device, and comparing the test pattern with the reference marks.

14 Claims, 7 Drawing Sheets

(51) Int. Cl.
*B29C 64/112* (2017.01)
*B33Y 50/02* (2015.01)
*B29C 64/393* (2017.01)

(56) References Cited

U.S. PATENT DOCUMENTS

| | | |
|---|---|---|
| 6,483,596 B1 | 11/2002 | Philippi |
| 6,755,499 B2 | 6/2004 | Castano et al. |
| 8,136,910 B2 | 3/2012 | Batalla et al. |
| 8,167,395 B2 | 5/2012 | Fienup et al. |
| 8,292,398 B2 | 10/2012 | Mizes et al. |
| 8,517,502 B2 | 8/2013 | Mizes et al. |
| 8,784,720 B2 | 7/2014 | Oberhofer et al. |
| 8,845,068 B2 | 9/2014 | Kammerzell |
| 2002/0060709 A1* | 5/2002 | Arquilevich ........... B41J 2/2135 347/19 |
| 2006/0061613 A1 | 3/2006 | Fienup |
| 2006/0180957 A1 | 8/2006 | Hopkinson |
| 2007/0238056 A1 | 10/2007 | Baumann |
| 2008/0079763 A1* | 4/2008 | Abrott ................... B41J 29/393 347/19 |
| 2010/0149247 A1 | 6/2010 | Yip |
| 2010/0217429 A1* | 8/2010 | Kritchman ......... G05B 19/4099 700/119 |
| 2010/0264302 A1 | 10/2010 | Philippi |
| 2010/0270708 A1 | 10/2010 | Jonasson |
| 2013/0328227 A1* | 12/2013 | McKinnon .......... B29C 67/0088 264/40.1 |
| 2016/0193788 A1* | 7/2016 | Din ....................... B33Y 50/02 425/150 |

OTHER PUBLICATIONS

Hiller, et al; "Methods of Parallel Voxel Manipulation for 3D Digital Printing"; Sep. 3, 2008; Mechanical and Aerospace Engineering Cornell University; (cont. from above) http://creativemachines.cornell.edu/papers/SFF07_Hiller.pdf.

* cited by examiner

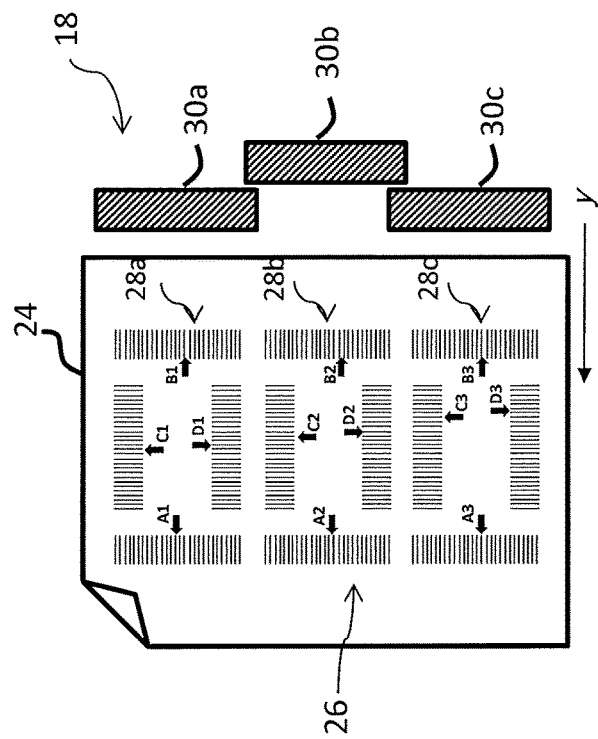
Fig. 3b
Fig. 3d
```
Pen1_skew_tz = B1 - A1
Pen1_skew = D1 - C1
Pen1_tz = Pen1_skew_tz - Pen1_skew
Pen1_X_pos = average (C1, D1)
Pen1_Y_pos = average (A1, B1)
Pen2_skew_tz = B1 - A1
Pen2_skew = D1 - C1
Pen2_tz = Pen2_skew_tz - Pen2_skew
Pen2_X_pos = average (C1, D1)
Pen2_Y_pos = average (A1, B1)
Pen1_to_Pen2_X = Pen2_X_pos - Pen1_X_pos
Pen1_to_Pen2_Y = Pen2_Y_pos - Pen1_Y_pos
...
```
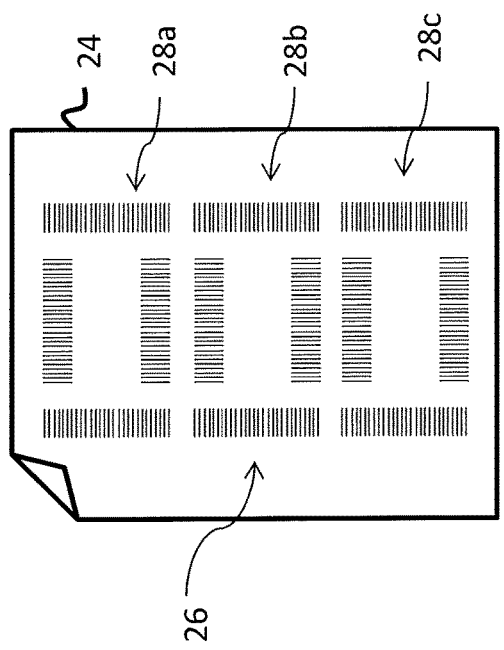
Fig. 3a
A1 = 12; B1 = 15; C1 = 8; D1 = 9
A2 = 11; B2 = 14; C2 = 8; D2 = 9
A3 = 12; B3 = 16; C3 = 8; D3 = 10
Fig. 3c

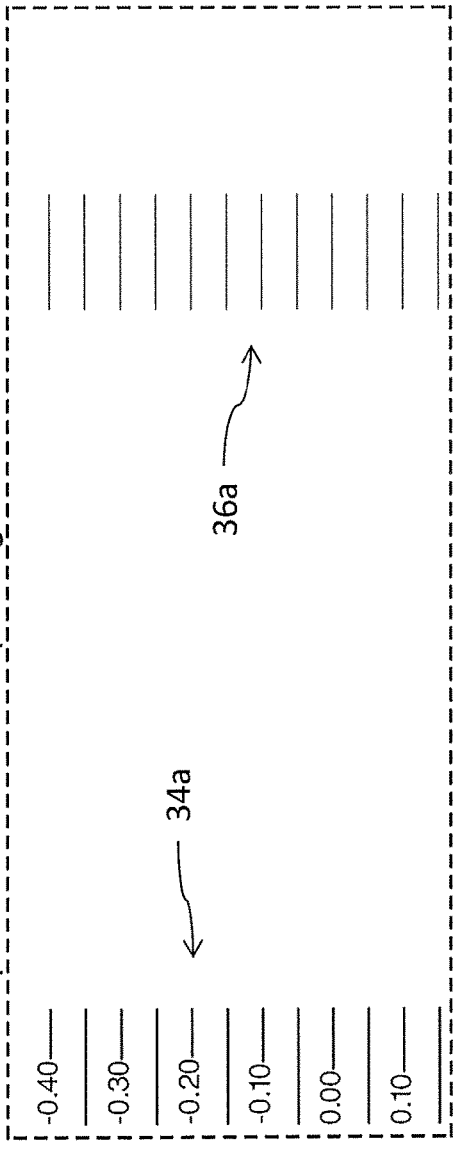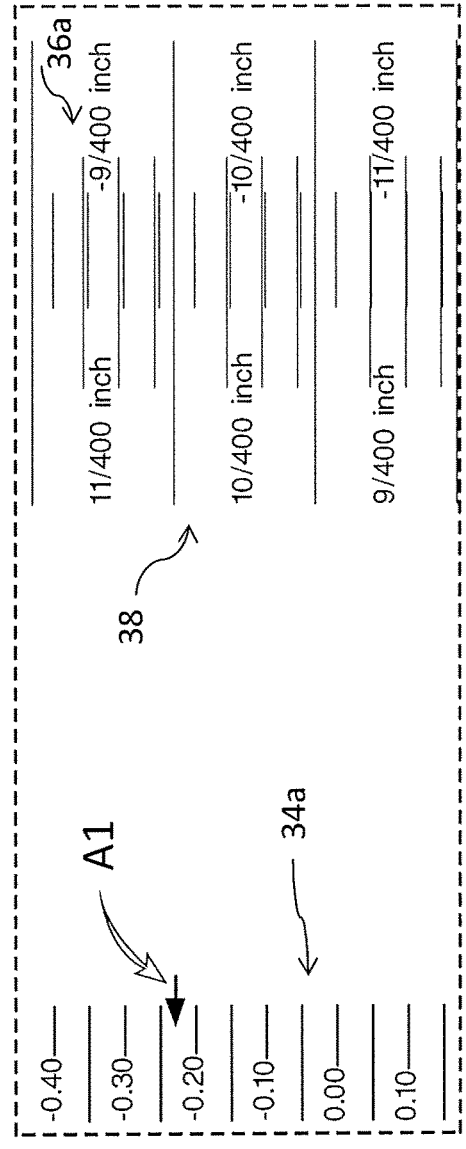
Fig. 5a
Fig. 5b

MISALIGNMENT DETECTION FOR A 3D PRINTING DEVICE

BACKGROUND

The disclosure relates to additive manufacturing techniques, also known as three-dimensional (3d) printing. 3d printing is rapidly evolving as a versatile manufacturing technique that allows to replace or complement manufacturing techniques such as molding, cutting, or grinding. Candidates for 3d printing include functional and aesthetic components of machinery, consumer products, and industrial products that are produced in short runs and, in particular, highly customized and high value products. These products usually need to be fabricated with carefully-controlled dimensions, smooth surfaces, and good detail. Misalignments of the 3d printing device may lead to geometrical distortions and deviations. The present disclosure is concerned with techniques for detecting and correcting misalignments of a 3d printing device so to enhance the quality of the 3d printing.

BRIEF DESCRIPTION OF THE DRAWINGS

FIGS. 3a to 3d are schematic views to illustrate the method according to FIG. 2 in additional detail;

FIGS. 5a and 5b show a detail of the reference marks before and after printing of the test pattern, respectively;

DETAILED DESCRIPTION

Figure 1:
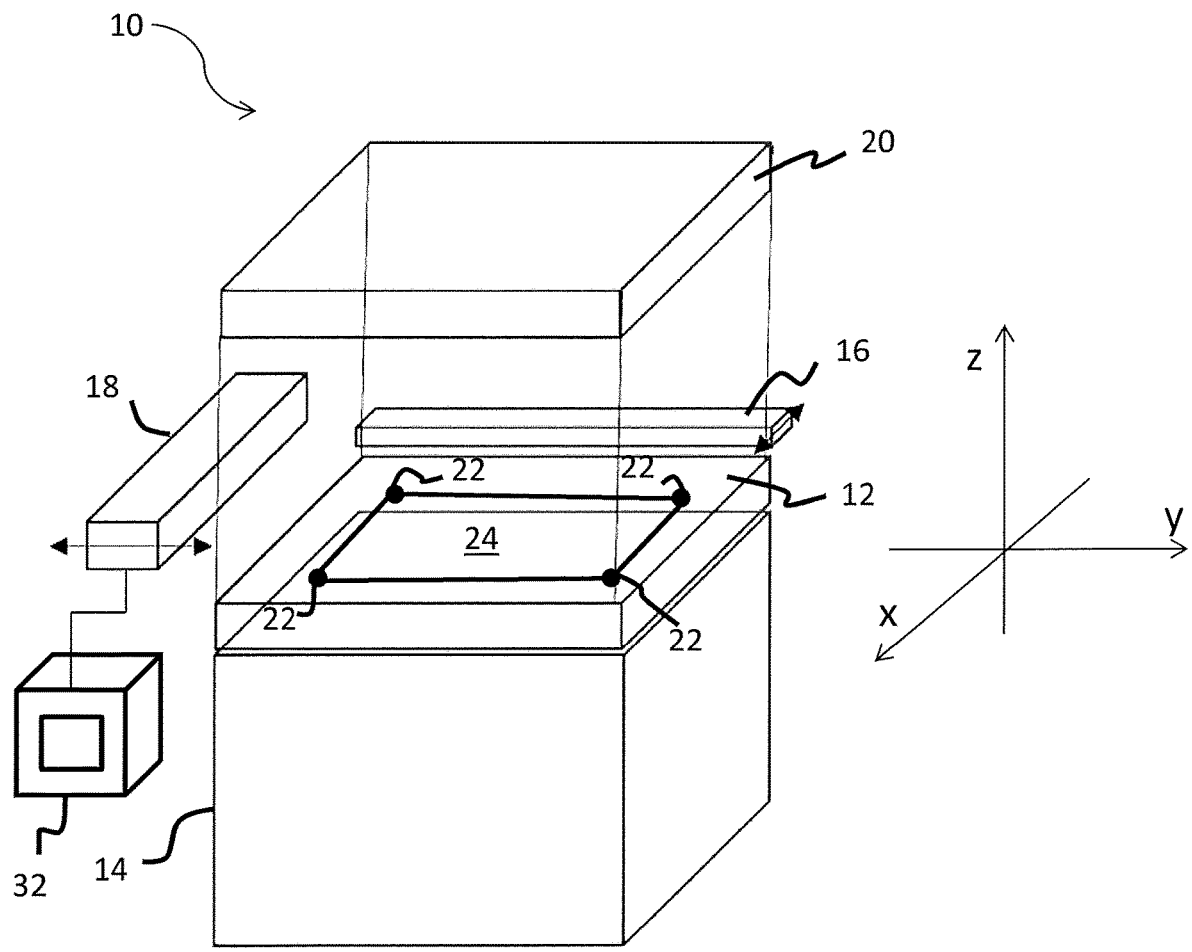
FIG. 1 is a conceptual perspective drawing of an example of a 3d printing device.

The disclosure generally relates to a method for detecting a misalignment of a 3d printing device, comprising providing a reference pattern in a print zone of a 3d printing device, said reference pattern comprising a plurality of reference marks, printing a test pattern on said reference pattern by means of said 3d printing device, and comparing said test pattern with said reference marks to detect a misalignment of said 3d printing device.

A comparison of said test pattern printed by means of said 3d printing device with said reference marks may allow to detect misalignments of said 3d printing device reliably, quickly and with high accuracy. The method according to the present disclosure may be employed at regular intervals during the lifetime of the 3d printing device, either by the user of the 3d printing device or by service personnel.

Based on a comparison of said test pattern with said reference marks, it may be determined whether misalignments are present in the 3d printing device. If so, these misalignments may subsequently be corrected by re-calibrating the 3d printing device.

The techniques described in this disclosure are versatile, and may be employed in a large variety of 3d printing technologies. For instance, the 3d printing device may be an inkjet type printing device which delivers a liquid or colloidal binder material, such as a liquid fusing agent to layers of a powdered build material.

Said reference marks may comprise any pattern or characters against which said printed test pattern may be compared. In particular, said reference marks may comprise lines, hatchings, one-dimensional or two-dimensional geometrical objects, characters, or numbers.

In an example, said reference pattern comprises a first set of reference marks extending in a first direction, and a second set of reference marks extending in a second direction different from said first direction.

In particular, said second direction may be perpendicular to said first direction.

Providing the reference marks on the reference sheet in different spatial directions allows to reliably detect different types of misalignment.

A misalignment, in the sense of the present disclosure, may denote any deviation of the print output from the planned or projected output, in particular any spatial and/or angular deviation.

For instance, said misalignment may comprise a scan axis displacement and/or a print head axis displacement and/or an angular displacement.

For instance, said misalignment may comprise a misalignment of printheads of a 3d printing device.

Some 3d printing devices may be provided with build units that may comprise a printing platform and/or powder container, and may be removably integrated into a 3d printing device that comprises a printing unit. In these examples, a misalignment may refer of a misalignment of said build unit with respect to said printing unit.

Said 3d printing device may comprise a plurality of printing units, and said reference pattern may comprise a plurality of reference marks corresponding to said respective printing units.

In particular, each said printing unit may comprise at least one print head.

Providing the reference marks in correspondence with the printing units allows to detect misalignments of the individual printing units separately, as well as misalignments of one printing unit with respect to another printing unit.

Said comparing said test pattern with said reference marks may comprise determining a location of said test pattern relative to said reference marks.

A test pattern, in the sense of the present disclosure, may denote any pattern that can be printed by means of said 3d printing device and is suitable to be compared with said reference marks.

In an example, said test pattern comprises a pattern of 2d objects and/or a pattern of 1d objects.

In particular, said test pattern may comprise a plurality of lines.

In an example, said 3d printing device may be adapted to print a liquid printing fluid, in particular ink, on said print zone, and printing said test pattern may comprise the printing of said printing fluid.

In particular, said two-dimensional test pattern or said one-dimensional test pattern may be printed on said reference pattern by printing said printing |fluid|$_{[bb1]}$.

A test pattern comprising two-dimensional objects and/or one-dimensional objects is well-suited for comparison with said reference marks. Moreover, a 2d or 1 d test pattern can be printed quickly and with minimum waste of printing material. In some applications, the techniques of the present disclosure may be employed in an inkjet-type printing device adapted for printing both a liquid printing fluid, such as ink, and/or a liquid fusing agent. Printing said test pattern in these applications may involve merely the printing of said printing fluid, without the printing of said liquid fusing agent, and may allow for an accurate detection of misalignment without any waste of 3d printing material or fusing agent.

However, the disclosure is not limited to a two-dimensional or one-dimensional test pattern, and may also comprise a three-dimensional test pattern printed on said reference pattern.

Said method may further comprise correcting a detected misalignment of a printing unit of said 3d printing device based on results of said comparing.

Said reference pattern need not be a permanent constituent of the print zone or 3d printing device, but may rather be provided on an external media, in particular a media specifically inserted into said 3d printing device for the purpose of detecting said misalignment.

In an example, providing said reference pattern comprises placing a reference sheet in said print zone, said reference sheet comprising said reference pattern.

In particular, said reference sheet may be placed removably in said print zone.

Providing said reference pattern on an external media has the benefit that the reference pattern may be adapted depending on the applications. Moreover, after the test pattern has been printed on the reference sheet, the reference sheet can be removed from the 3d printing device, and hence the test pattern does not interfere with subsequent 3d printing. Once the 3d printing device shall be recalibrated, this can be done simply by inserting a fresh reference sheet into the print zone.

A reference sheet, in the sense of the present disclosure, may comprise any media that may be provided with reference marks and may be placed in a print zone of a 3d printing device and is suitable to be imprinted with said test pattern. The reference sheet may comprise a sheet of paper or a plastic or metal foil.

Said reference marks may be printed on said reference sheet.

In particular, said reference sheet may be a sheet printed with a reference printer. Said reference printer may be different from said 3d printing device.

Printing the reference sheet with a reference printer different from said 3d printing device allows to establish an independent reference against which the 3d printing device may be tested, so as to detect misalignments with a high degree of accuracy.

In an example, said method may further comprise printing said reference sheet, in particular by means of a reference printer different from said 3d printing device.

In particular, said reference sheet may be removably placed in said print zone.

In an example, said reference sheet may be placed manually in said print zone.

Placing the reference sheet manually is quick, and does not rely on sophisticated equipment.

However, the disclosure is not so limited, and alternatively comprises automatically placing said reference sheet in said print zone.

In particular, said reference sheet may be fed to said print zone by means of a media feeding device.

An automatic media feeding may enhance the user comfort.

In an example, said method further comprises removing said reference sheet from said print zone, in particular after said printing said test pattern on said reference sheet by means of said 3d printing device.

The removal of said reference sheet from said print zone may be done manually or automatically, and may facilitate the comparison of said test pattern with said reference marks.

However, the disclosure is not limited to reference patterns on a removable reference sheet. Rather, at least part of said reference pattern may be permanently incorporated into said print zone.

For instance, said reference pattern may be engraved into said print zone.

A permanent reference pattern (as opposed to a transient, removable reference pattern) does not rely on any paper feeding, and may hence reduce the system complexity and enhance the user comfort.

Said method may further comprise removing said printed test pattern from said reference pattern.

A cleaning of a previous test pattern may prepare the 3d printing device for another calibration in which a new test pattern is printed.

Comparing said test pattern with said reference marks may be done manually by a user, such as by visual inspection.

A manual comparison can be done quickly, and does not rely on sophisticated sensor technology, thereby facilitating the setup and operation of the 3d printing device.

In an example, said reference marks comprise a scale, and comparing said test pattern with said reference marks may comprise reading off said scale.

Said method may further comprise inputting said readings of said scale to correct a misalignment of said 3d printing device, or a misalignment of a build unit and/or printing unit of said 3d printing device.

For instance, the user may read off said scale and input said readings into said 3d printing device, thereby allowing said 3d printing device to compute corrections in the positioning and movement of the printing unit of the 3d printing device so that misalignments may be fully compensated or minimized.

However, the disclosure is not limited to a manual comparison. Comparing said test pattern with said reference marks may also be done automatically by said 3d printing device, for instance by employing sensor means to automatically compare said test pattern with said reference marks.

Based on the results of the comparing, the 3d printing device may then autocorrect the detected misalignment without substantial user interference.

The disclosure also relates to a build unit for a 3d printing device, comprising a print zone with a reference pattern, said reference pattern comprising a plurality of reference marks.

Said print zone may comprise a powder platform.

Said build unit may further comprise a storage container for 3d printing material, such as printing powder.

In the sense of the present disclosure, a build unit may be permanently and fixedly incorporated into said 3d printing device.

Alternatively, said build unit may be a separate unit adapted to be removably inserted into a 3d printing device.

Said print zone may be adapted to removably hold a reference sheet, said reference sheet comprising said reference pattern.

For instance, said print zone may be provided with fixation means to removably hold and align said reference sheet in said print zone. Said fixation means may comprise fixation brackets, or any other kind of means for removably holding and aligning said reference sheet in said print zone.

The disclosure also relates to a 3d printing device with a print zone comprising a reference pattern, said reference pattern comprising a plurality of reference marks, at least one printing unit to print a test pattern on said reference pattern, and an input unit to receive results of a comparison of said test pattern with said reference marks.

In an example, the 3d printing device further comprises a processing unit data-connected to said input unit, said processing unit to correct a detected misalignment of said at least one printing unit based on said results of said comparison.

In an example, said at least one printing unit comprises at least one print head, said at least one print head for selectively applying a liquid ink and/or a liquid fusing agent to a printing material.

The 3d printing device may further comprise a fusing unit to fuse said printing material.

Said fusing unit may comprise a heating unit to heat said printing material.

The 3d printing device may also comprise a transport unit to transport a printing material to said print zone.

Some such 3d printing devices may comprise an inkjet-type printing unit or print head to deliver a liquid or colloidal binder material to layers of a powdered printing material. However, the techniques of the present disclosure are not so limited, and can be employed to detect and correct misalignments in a large variety of 3d printing devices employing various types of 3d printing technologies.

The 3d printing device may further comprise a print carriage that comprises said at least one printing unit.

Said print carriage may extend across an entire width of said print zone and/or may define an extension of said print zone in a first direction.

Said print carriage may further be moveable across a length of said print zone in a second direction different from said first direction, in particular perpendicular to said second direction.

Said print carriage may not be moveable in said first direction.

A print carriage that extends across an entire width of said print zone in a first direction, and is swept across said print zone in said second direction, allows to print an entire test pattern in one pass, and hence swiftly and in parallel for each of a plurality of printing units or print heads. This simplifies and speeds up the detection and correction of misalignments.

In some examples, said print carriage may comprise a plurality of printing units in a staggered configuration. Each of said printing units may comprise one or a plurality of print heads, such as for applying a liquid fusing agent and/or for applying liquid ink of possibly various colors.

In an example, said 3d printing device comprises a sensor unit to automatically compare said test pattern with said reference marks.

For instance, said sensor unit may be mounted to said printing unit and/or to said print carriage.

Said 3d printing device, in particular said build unit may comprise a media feeding unit adapted to automatically feed said reference sheet to said print zone and/or do automatically place and/or hold said reference sheet in said print zone.

A media feeding unit may enhance the user comfort.

However, as described above, the disclosure is not limited to reference patterns provided on a reference sheet. Alternatively, said reference pattern may be permanently incorporated into said print zone, such as engraved into said print zone.

Said 3d printing device may be adapted to implement a method with some or all of the features described above.

The disclosure further relates to a computer program or to a computer program product comprising computer-readable instructions, such that said instructions, when read on a computer, in particular on a computer connected to or incorporated into a 3d printing device with some or all of the features described above, implement on said 3d printing device a method with some or all of the features described above.

Implementations will now be described in greater detail with reference to FIGS. 1 to 7.

FIG. 1 is a schematic perspective view of a 3d printing device 10 according to an example of the present disclosure.

The 3d printing device 10 comprises a powder platform 12 that serves as a print zone in which a three-dimensional object is formed (printed) from printing material (not shown) provided to the powder platform 12 from a powder container 14. The powder that serves as the printing material may comprise polyamide (PA) or some other plastic material, but may also comprise a metal powder or a ceramic powder, depending on the applications.

The powder platform 12 and powder container 14 may be fixedly integrated into the 3d printing device 10. Alternatively, the powder platform 12 and powder container 14 may form a stand-alone build unit, or may constitute parts of stand-alone build unit, which may be removably inserted to form part of the 3d printing device 10.

The powder may be applied to the powder platform by means of a recoater roller 16 which is movably mounted to sweep across the powder platform 12 in a first direction (x). The recoater roller 16 may also comprise fusing lamps (not shown) staggered at an underside thereof, which may serve as a heating unit to heat the printing material in order to fuse the powder.

As can be taken from FIG. 1, the 3d printing device 10 further comprises a print carriage 18 that extends across the entire width of the powder platform 12 along the first direction (x), thereby defining the print zone, and is movably mounted to sweep across the powder platform 12 in a second direction (y) perpendicular to said first direction (x).

The print carriage 18 may comprise a plurality of printing units (not shown) formed at an underside of the print carriage 18, wherein each said printing unit comprises one or a plurality of print heads. The print heads may apply a liquid fusing agent and/or a liquid ink to the powder provided on the powder platform 12. The print heads may be individually controlled so as to selectively apply said liquid fusing agent and/or said liquid ink depending on the position of the print carriage 18 across the powder platform 12 in the second direction (y) and depending on the position of the print head along the length of the print carriage 18 in the first direction (x).

The 3d printing device 10 further comprises a plurality of pre-heating lamps 20 mounted in a gantry above the powder platform 12. The pre-heating lamps 20 serve for pre-heating the printing material on the powder platform 12.

The powder platform 12 is movably mounted in the 3d printing device 10 in the vertical (z) direction, so that it can be raised or lowered in accordance with the printing progress.

The manufacturing (printing) of three-dimensional objects with the 3d printing device 10 of FIG. 1 will now be explained in further detail.

Printing material, such as the polyamide powder, is transported from the powder container 14 to the recoater roller 16, which sweeps across the powder platform 12 along the first direction (x), thereby spreading the powder across the powder platform 12. Subsequently, the recoater roller 16 returns to its rest position (shown in FIG. 1), and the print carriage 18 sweeps across the powder platform 12 in the second direction (y) and selectively applies a liquid fusing agent from its print heads at predetermined positions in the x and y directions. These positions correspond to the object to be formed.

The print heads of the print carriage 18 may also be adapted to selectively apply further liquids, such as a detailing agent that can be selectively applied where the fusing action needs to be reduced or amplified, or liquid ink of a variety of colors.

Once the fusing agent has been applied to the powder on the powder platform 12, the print carriage 18 returns to its rest position (as shown in FIG. 1), and the recoater roller 16 again sweeps across the powder platform 12 in the x direction to heat the powder by means of the fusing lamps staggered at the underside thereof. Due to the heat applied by means of the fusing lamps, the powder particles are selectively fused at those locations where the fusing agent has been applied, but remain unfused at the other locations. The detailing agent may selectively reduce fusing at the boundaries to produce a part with sharp and smooth edges. The application of ink may selectively color the object.

Once the fusing has been completed, the recoater roller 16 returns to its rest position (shown in FIG. 1). The powder platform is lowered along the vertical direction (z), and the process is repeated with a new layer of printing material until a complete three-dimensional object has been formed.

A 3d printing device 10 as described above with reference to FIG. 1 is sometimes known as an inkjet-type 3d printing device. However, these are mere examples, and the techniques of the present disclosure are not so limited, but are generally applicable to a large variety of 3d printing devices.

As will be appreciated by one skilled in the art, the quality of the 3d printing depends on the accuracy with which the fusing agent, detailing agent, or ink are applied at the predetermined positions across the powder platform 12, which in turn depends crucially on the correct positioning and alignment of the printing units and print heads. Distortions or misalignments may be due to displacements in the x and y axis (print head axis displacements and scan axis displacements, respectively), and angular displacements with respect to the vertical z axis (sometimes known as $\theta_Z$ displacements).

In order to detect and correct these and other misalignments, the print zone of the 3d printing device 10 may be equipped with a reference pattern comprising a plurality of reference marks. Examples of reference marks will be described further below with reference to FIGS. 3 to 5.

For instance, the 3d printing device 10 may be equipped with a plurality of fixing brackets 22 in the powder platform 12, which are adapted to hold and align a reference sheet 24 comprising the reference pattern. For instance, the reference sheet 24 may be a sheet of paper comprising a plurality of reference marks.

Figure 2:
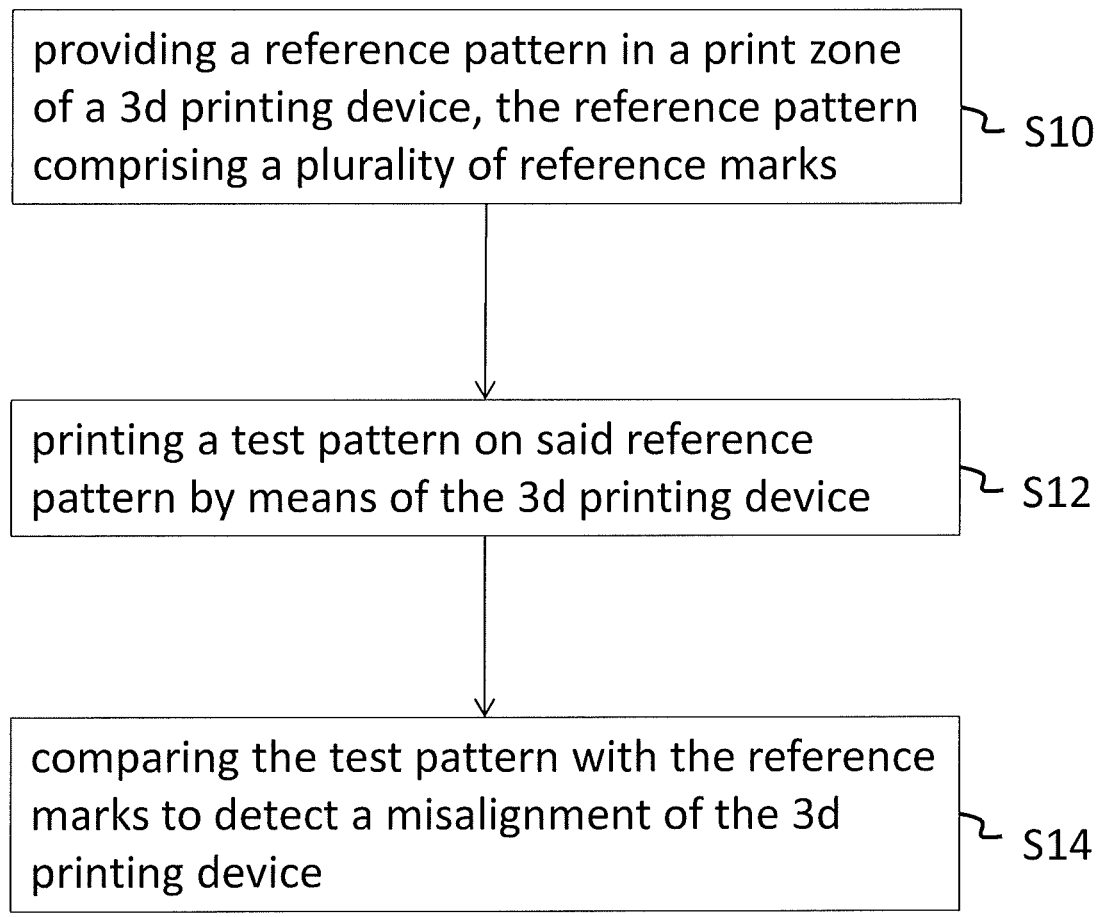
FIG. 2 is a flow diagram of an example of a method for detecting a misalignment of a 3d printing device.

A method for detecting a misalignment according to an example will now be described with reference to FIG. 1 and the flow diagram of FIG. 2.

In S10, a reference pattern is provided in the print zone of the 3d printing device 10, In the example of FIG. 1, a reference sheet 24 comprising the reference marks may be fixed on the powder platform 12 by means of the fixing brackets 22. Alternative examples in which the reference marks are permanently incorporated into the powder platform 12 will be described later with reference to FIG. 7.

In S12, a test pattern is printed on said reference pattern by means of the 3d printing device 10. In particular, the test pattern may comprise a line pattern that can be obtained by printing merely ink from the print heads of the print carriage 18. In this way, the test pattern can be printed quickly, and does not waste any printing material. However, in other examples, the printing of the test pattern may involve the printing of a three-dimensional object on the reference pattern, as described above with reference to FIG. 1.

In S14, said test pattern is compared with said reference marks to detect a misalignment of said 3d printing device 10.

Returning to the example of FIG. 1, in order to compare said test pattern with said reference marks, the reference sheet 24 may be removed from the print zone 12 after the test pattern has been printed, and may be visually inspected by the user. Alternatively, the comparison may involve the use of a sensor means (not shown) incorporated into the recoater roller 16 or the print carriage 18, and hence a comparison of said test pattern with said reference marks may involve sweeping the recoater roller 16 or the print carriage 18 across the print zone 12 so to allow the sensor means to analyze the test pattern printed on the reference pattern. The sensor means may comprise an optical sensor with a lamp, such as an LED or a laser, and a camera. This configuration allows a fully automatic comparison of said test pattern with said reference marks.

The reference sheet 24 may be a sheet of paper on which the reference marks have been printed by means of a reference printer different from the 3d printing device 10. For instance, the reference printer may be a 2d printer that has been checked to be free of misalignments.

FIG. 3a shows an example of a reference sheet 24 with reference marks 26 that comprise three identical reference sub-patterns 28a to 28c, wherein each of the sub-patterns 28a to 28c comprises both horizontal and vertical patterns of lines arranged in a rectangular fashion.

The reference sheet 24 shown in FIG. 3a may be employed in a 3d printing device whose print carriage 18 comprises three staggered print heads 30a, 30b, 30c, as shown schematically in FIG. 3b. Each of the print heads 30a, 30b, 30c may print a test pattern of horizontal and vertical lines A1 to A3, B1 to B3, C1 to C3, and D1 to D3 superimposed on the reference sub-patterns 28a to 28c.

The user may now remove the reference sheet 24 from the powder platform 12 to compare the test pattern comprising the lines A1 to A3, B1 to B3, C1 to C3, and D1 to D3 with the respective reference marks 26. In order to facilitate the comparison, the reference marks may be provided with scales that allow a user to read off the respective locations of the arrows A1 to A3, B1 to B3, C1 to C3, and D1 to D3 on the reference marks 26, as will later be described with reference to FIGS. 4 and 5. FIG. 3c shows an example of such readings.

The user may type in these readings into an input unit 32 connected to the print carriage 18, as shown schematically in FIG. 1. Based on these readings, a processing unit may automatically compute the misalignments, such as a print head axis displacement, a scan axis displacement, or an angular ($\theta_Z$) displacement.

Given that the reference sub-patterns 28a to 28c each comprise two horizontal and two vertical scales, the errors and angles of all the print heads in the printing zone may be measured along both the x-axis and the y-axis. The differences of the patterns on each side can be used to compute the paper skew. In other words, intra-print head differences along the printing direction y are used to measure skew. The difference in this measure between the various print heads 30a to 30c may be employed to compute the relative printed axis misplacement. Hence, inter-print head differences in the printing direction y are used to correct misplacement between the several print heads 30a, 30b, 30c of the print carriage 18.

This reference pattern is robust to small misplacements of the reference sheet 24 in both the x direction and y direction, as well as to small rotations.

Based on the determined misalignments, corrections may be employed to the printing process to correct for the misalignments. Determining the misalignment based on the readings which the user inputs into the input unit 32, and calculating the corrections may be employed in a processing unit data-connected to the input unit 32. The processing unit may be part of the 3d printing device 10, in particular part of the input unit 32, but may also be provided as a separate unit. The processing unit may employ a software code to compute the misalignments and the corrections, as schematically indicated in FIG. 3d.

Figure 4:
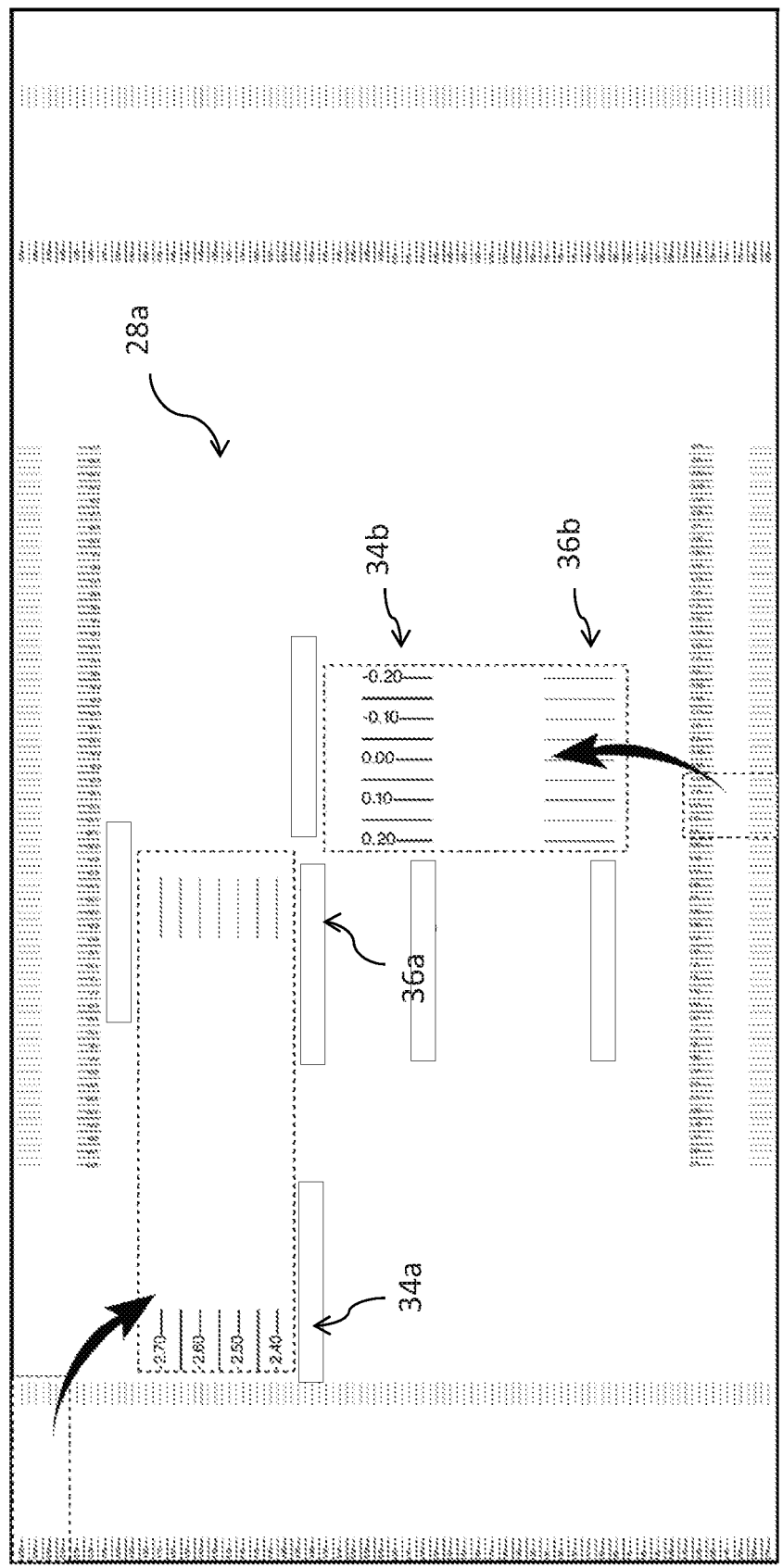
FIG. 4 shows an example of a reference sheet that can be employed in the context of the present disclosure.

FIG. 4 shows one of the reference sub-patterns 28a and the corresponding scales in additional detail. Both the horizontal and the vertical scan axes comprise a rough scale 34a, 34b and a fine-tune scale 36a, 36b, respectively. The rough scales 34a, 34b are labeled with numerals that can be read off by the user. The fine-tune scales 36a, 36b function as a caliper, and provide fine tuning based on a match of the line of the fine-tune scale 36a, 36b with an overlying test pattern.

FIG. 5a is a detailed view of the rough scale 34a and the fine-tune scale 36a before printing the test pattern, whereas FIG. 5b shows a corresponding detail after printing of the test pattern 38. As can be taken from FIG. 5b, the test pattern 38 comprises both the arrow A1 that overlaps the rough scale 34a, and a sequence of horizontal lines that overlap the fine-tune scale 36a. The fine-tuning can be determined from a match of the lines of the fine-tune scale 36a and the test pattern 38.

In the example shown in FIG. 5b, the measured correction would yield a value of −0.2 inches minus 10/400 inches, which equals −0.225 inches. In general, arbitrary units may be used for the rough scale and the fine-tune scale.

The techniques described above allow to accurately measure and correct scan axis displacements, print head axis displacements, and angular ($\theta_z$) displacements in a one-pass printing and with a high degree of accuracy. When employed to a carriage with a plurality of print heads, the print head-to-print head misalignment can also be determined and corrected accurately. The techniques are robust to misplacements of the reference sheet 24 on the print zone 12 in the x-axis, y-axis and with respect small rotations of the reference sheet 24.

In the example described above with reference to FIG. 1, the reference sheet 24 comprising the reference marks 26 may be manually inserted into the 3d printing device 10, and may be manually fixed to the powder platform 12 by means of the fixing brackets 22. However, the disclosure is not so limited.

Figure 6:
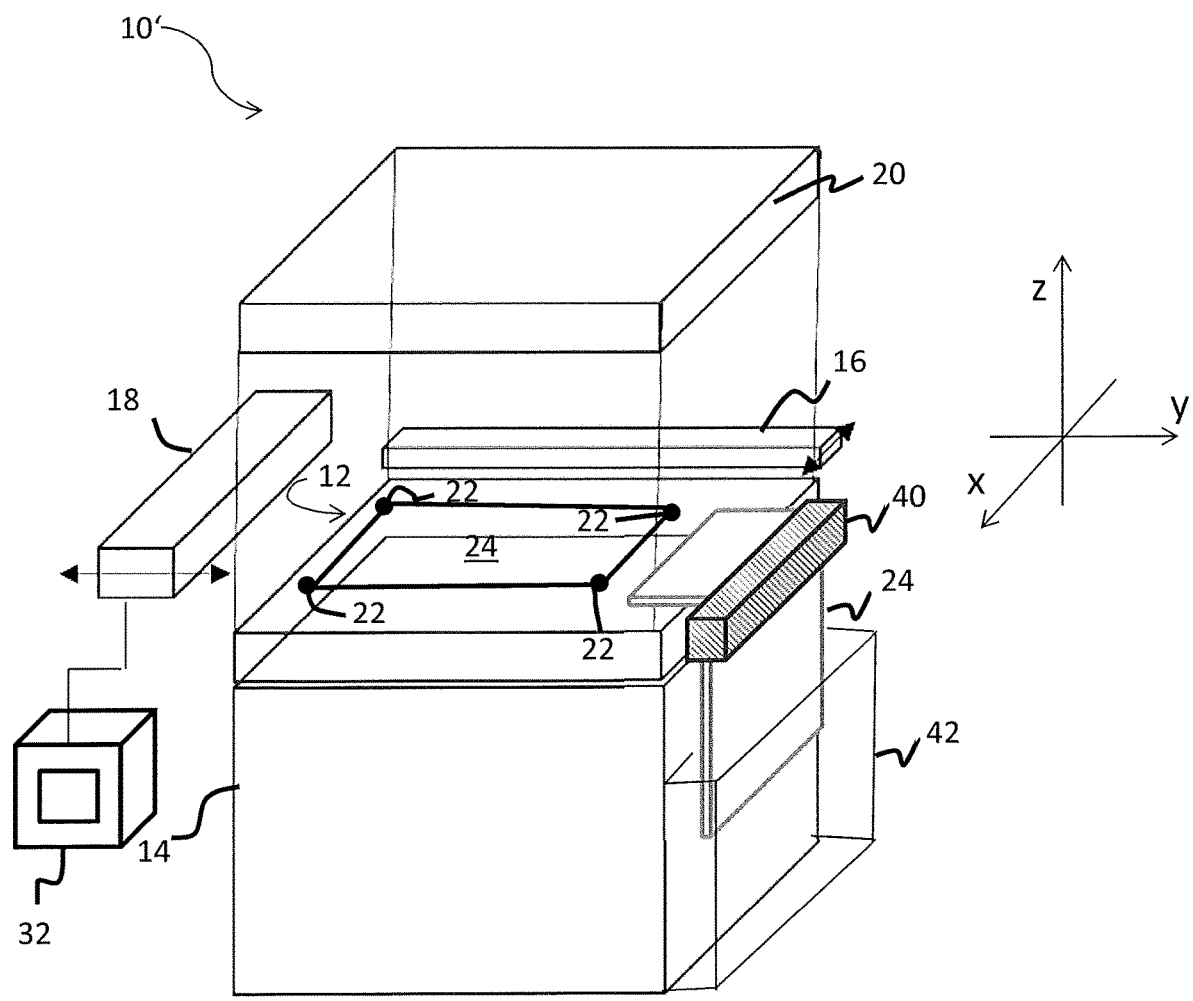
FIG. 6 is a conceptual perspective drawing of another example of a 3d printing device, incorporating a media feeding unit to automatically feed a reference sheet to a print zone according to an example.

FIG. 6 shows another example of a 3d printing device 10' that comprises a media feeding unit 40 adapted to automatically feed the reference sheet 24 into position on the powder platform 12. As can be taken from FIG. 6, the media feeding unit 40 may feed the reference sheet 24 from a reference sheet storage unit 42, such as a paper basket mounted to a side surface of the 3d printing device 10'.

The media feeding unit 40 may be similar in design and functionality to paper feeding units in some 2d printers, with the exception that the feeder 40 may work vertically as opposed to horizontally.

The media feeding unit 40 may also serve to remove the reference sheet 24 automatically from the powder platform 12 after the test pattern has been printed on the reference sheet 24.

Apart from the media feeding unit 40, the 3d printing device 10' shown in FIG. 6 fully corresponds to the example described above with reference to FIGS. 1 to 5, and hence a detailed description will be omitted.

Various techniques may be employed for holding and fixing the reference sheet 24 on the powder platform 12. As an alternative to the fixing brackets 22 described above with reference to FIG. 1, a portion of the powder platform 12 corresponding in size to the size of the reference sheet 24 may be lowered, resulting in a bed in which the reference sheet 24 may be placed. The vertical walls of the rim may serve to support and hold the reference sheet 24. In case additional support is desired for the reference sheet 24, a plurality of flat metallic squares can be used as an accessory to be put on top of the reference sheet 24, for instance one square at each corner, similar to metallic guides used in sheet-fed scanners.

In the examples described above with reference to FIGS. 1 to 6, the reference pattern is provided on an external reference sheet for a one-time use. However, the disclosure is not so limited, and likewise comprises configurations in which the reference pattern is incorporated into the 3d printing device.

Figure 7:
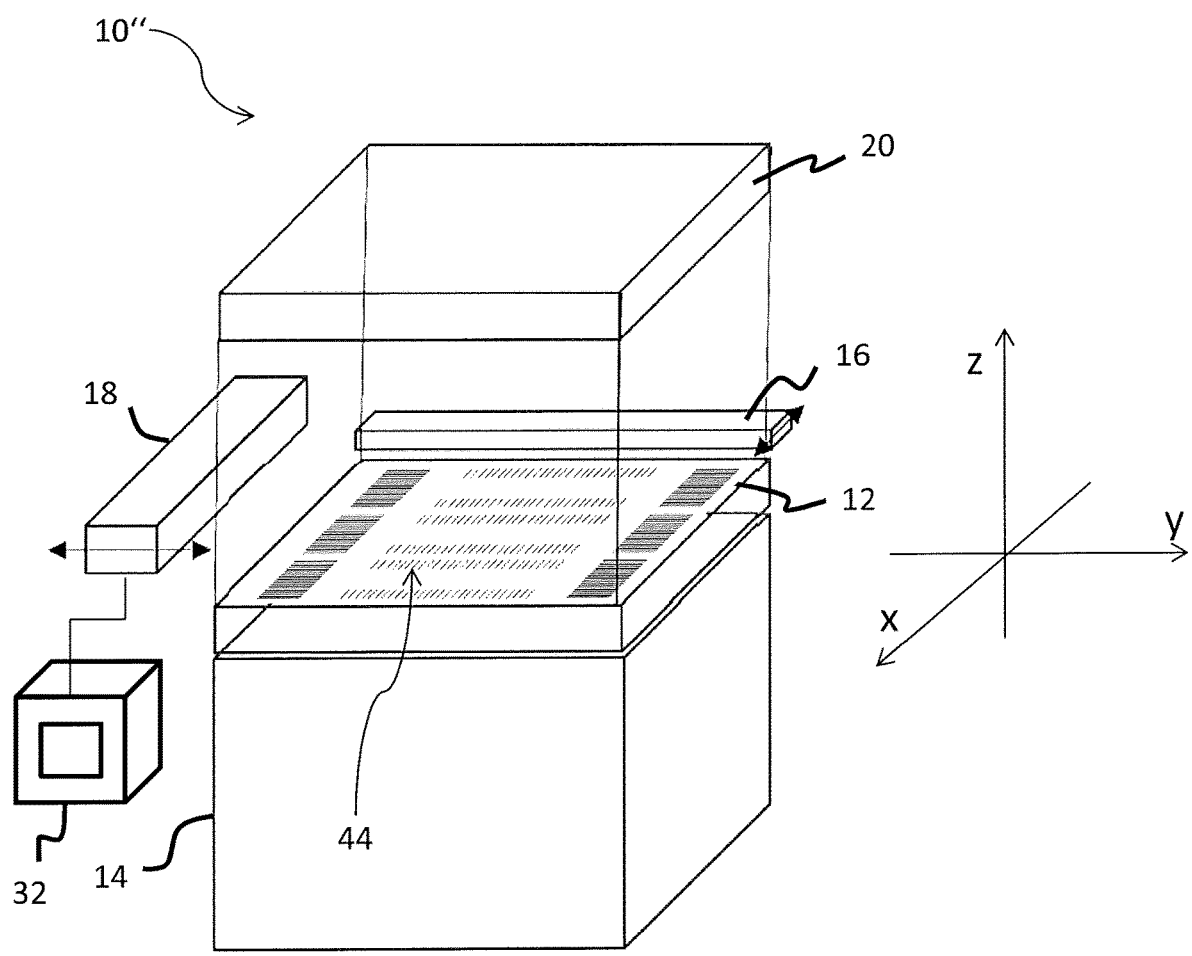
FIG. 7 is a conceptual drawing of a still further example of a 3d build unit and printing device in which a reference pattern is permanently engraved into the print zone.

An example of a 3d printing device 10" in which a reference pattern 44 is engraved into the upper surface of the powder platform 12 is illustrated in FIG. 7. Apart from this distinction, the printing device 10" fully corresponds to the 3d printers 10, 10' described above with reference to FIGS. 1 and 6, respectively, and hence a detailed description will be omitted.

The printing unit of the print carriage 18 may print the test pattern directly onto the engraved reference pattern 44. For instance, the print carriage 18 may comprise inkjet print heads adapted to print a test pattern from liquid ink on the engraved reference pattern 44. The engraved reference pattern 44, and comparing the test pattern with the reference marks may correspond fully to the examples described above with reference to FIGS. 1 to 5.

After the comparison of the test pattern with the reference marks, the powder platform 12 may be cleaned to remove the test pattern. For water-based ink, cleaning with a regular cloth with water can be sufficient. After the cleaning, powder may be applied to the powder platform 12, and the regular 3d printing may continue.

The examples described above and the Figures merely serve to illustrate the method and system according to the present disclosure, but should not be understood to imply any limitation. The scope of the disclosure is to be determined solely by means of the appended claims.

REFERENCE SIGNS 10, 10', 10" 3d printing device
12 powder platform/print zone
14 powder container
16 recoater roller
18 print carriage
20 pre-heating lamps
22 fixing brackets 24 reference sheet
26 reference marks
28a-28c reference sub-patterns
30a-30c print heads of print carriage 18
32 input unit
34a, 34b rough scales
36a, 36b fine-tune scales
38 test pattern
40 media feeding unit
42 reference sheet storage unit
44 engraved reference pattern

What is claimed is:

1. A method for detecting a misalignment of a three-dimensional (3D) printing device, comprising:
providing a reference pattern in a print zone of a 3D printing device, said reference pattern comprising a plurality of reference marks, wherein providing said reference pattern comprises placing a reference sheet in said print zone, said reference sheet comprising said reference pattern;
printing a test pattern on said reference pattern by means of said 3D printing device; and
comparing said test pattern with said reference marks to detect a misalignment of said 3D printing device.

2. The method according to claim 1, wherein said reference pattern comprises a first set of reference marks extending in a first direction, and a second set of reference marks extending in a second direction different from said first direction.

3. The method according to claim 1, wherein said 3D printing device comprises a plurality of printing units, wherein each said printing unit comprises at least one print head, and said reference pattern comprises a plurality of reference marks corresponding by assignation to said respective printing units.

4. The method according to claim 1, wherein said test pattern comprises a pattern of two-dimensional 2D objects or one-dimensional (1D) objects.

5. The method according to claim 1, wherein said test pattern comprises a 3D object.

6. The method according to claim 1, wherein comparing said test pattern with said reference marks is done by a user using a user interface.

7. The method according to claim 1, wherein said reference marks comprise a scale, and comparing said test pattern with said reference marks comprises reading off said scale.

8. The method of claim 2, wherein the first direction and second direction are perpendicular to each other.

9. The method of claim 1, wherein the plurality of reference marks comprise two scales in the first direction and two scales in the second direction.

10. The method of claim 1, wherein comparing said test pattern with said reference marks to detect a misalignment of said 3D printing device is performed automatically using a sensor.

11. The method of claim 1, further comprising automatically placing the reference sheet to receive the test pattern using a media feeding device.

12. The method of claim 1, wherein the reference pattern is printed with a reference printer different than the 3D printing device.

13. The method of claim 1, wherein the reference sheet is secured in the print zone using a fixation bracket.

14. The method of claim 1, wherein an edge of the reference sheet is aligned against a wall.

\* \* \* \* \*